United States Patent [19]

Glover et al.

[11] Patent Number: 5,178,714
[45] Date of Patent: Jan. 12, 1993

[54] APPARATUS FOR THE MANUFACTURE OF A PNEUMATIC TIRE

[75] Inventors: Christopher J. Glover, Buckingham; Anthony G. Goodfellow, Maghull, both of Great Britain

[73] Assignee: Apsley Metals Limited, United Kingdom

[21] Appl. No.: 339,182

[22] Filed: Apr. 17, 1989

[30] Foreign Application Priority Data

Apr. 23, 1988 [GB] United Kingdom ............... 8809646

[51] Int. Cl.⁵ ............................................. B29D 30/08
[52] U.S. Cl. ................................. 156/397; 156/405.1; 156/406.2; 156/425
[58] Field of Search .............. 156/405.1, 406.2, 408, 156/397, 425, 117, 130, 130.7, 184, 189, 126, 412; 425/17, 22

[56] References Cited

U.S. PATENT DOCUMENTS

| | | | |
|---|---|---|---|
| 3,652,024 | 3/1972 | Setnik | 156/425 |
| 3,740,292 | 6/1973 | Le Plond | 156/126 |
| 3,816,202 | 6/1974 | Stokes | 156/123 |
| 3,923,572 | 12/1975 | Garver | 156/416 |
| 4,084,422 | 8/1987 | Roedsett | 156/406.2 |
| 4,144,114 | 3/1979 | Enders | 156/414 |
| 4,465,536 | 8/1984 | Makino et al. | 156/408 |
| 4,689,106 | 8/1987 | Becht et al. | 156/406.2 |
| 4,698,011 | 10/1987 | Lamalle et al. | |
| 4,871,409 | 10/1989 | Perkins | 156/405.1 |

FOREIGN PATENT DOCUMENTS

| | | | |
|---|---|---|---|
| 2599296 | 12/1987 | France | 156/130.7 |
| 1215829 | 12/1970 | United Kingdom | |
| 2134439 | 8/1984 | United Kingdom | |

Primary Examiner—Peter Kratz
Attorney, Agent, or Firm—Stevens, Davis, Miller & Mosher

[57] ABSTRACT

Apparatus and method for the manufacture of an annular uncured elastomeric component for a tire. The component (11) is formed on a disc-like mandrel (10) comprising a flexible support (12) having a frustoconical surface on which a strip of unvulcanized elastomeric material is wound to form the component, and a rigid carrier (13) on which the support (12) is mounted. The carrier (13) is adapted for mounting on a turning head (31) for rotation of the mandrel as the strip is laid onto said receiving surface. The flexible support (12) is used as a carrier to transfer the formed component to another tire building location.

11 Claims, 3 Drawing Sheets

APPARATUS FOR THE MANUFACTURE OF A PNEUMATIC TIRE

This invention relates to a method and apparatus for the manufacture of a pneumatic tire and in particular to an apparatus and a method for forming an annular unvulcanized elastomeric component which can be assembled to a toroidal tire carcass.

The method and apparatus are particularly suitable for the manufacture and assembly of sidewall components to the mould carcasses of a radial tire.

In conventional radial tire manufacture the tire carcass is assembled on a flat drum and the sidewall components, apexes, and other components such as chaffers, bead reinforcements, etc., are added in the flat state. The carcass is then shaped up into a toroidal configuration prior to assembly of the breaker belt, tread, and sidewalls. The addition of the sidewalls in particular causes problems since they are typically produced from flat strip which is then wound around the toroidal carcass causing some distortions of the strip which may lead to sidewall blemishes in the finished tire.

Other proposed methods of sidewall assembly include producing an annular uncured sidewall in substantially its final shape in a discrete annular sidewall mould which is brought into contact with a shaped up carcass to fit the premoulded sidewall to the carcass. The sidewall mould then forms part of the tire curing mould. Such a method is proposed in British Patent GB2134439A. However this method has the disadvantage that it is not applicable to conventional tire building methods.

Accordingly there is provided an apparatus for the manufacture of an annular uncured elastomeric component for a tire and which comprises a flexible support having a surface thereon to receive a strip of unvulcanised elastomeric material, and a rigid carrier onto which the support is mounted, the carrier being adapted for mounting on a turning head for rotation of the mandrel as the strip is laid onto said receiving surface.

Preferably the apparatus further provides a means for producing unvulcanized elastomeric strip, a turning head for rotating the mandrel relative to the strip producing means so as to wind the strip onto the mandrel. The unvulcanized strip may be produced by an extruder and the extrudate formed to its final shape by a calender before being wound onto the surface.

Conveniently the former has a frustoconical outer surface onto which the strip is wound and the mandrel is held at a orientation such that the frustoconical surface is substantially horizontal at the point of application of the strip to the mandrel.

Also according to this invention there is provided a method of manufacture of an uncured elastomeric annular component for a tire wherein the component is formed directly onto a flexible disc like mandrel by winding an unvulcanized elastomeric strip onto the mandrel, the mandrel with component in-situ is then transferred to a second location at which the component is assembled to a tire, preferably without being removed from the flexible Mandrel before assembly to the tire has occurred.

BRIEF DESCRIPTION OF THE DRAWINGS

The invention will be described by way of example and with reference to the accompanying drawings in which.

Figure 1:
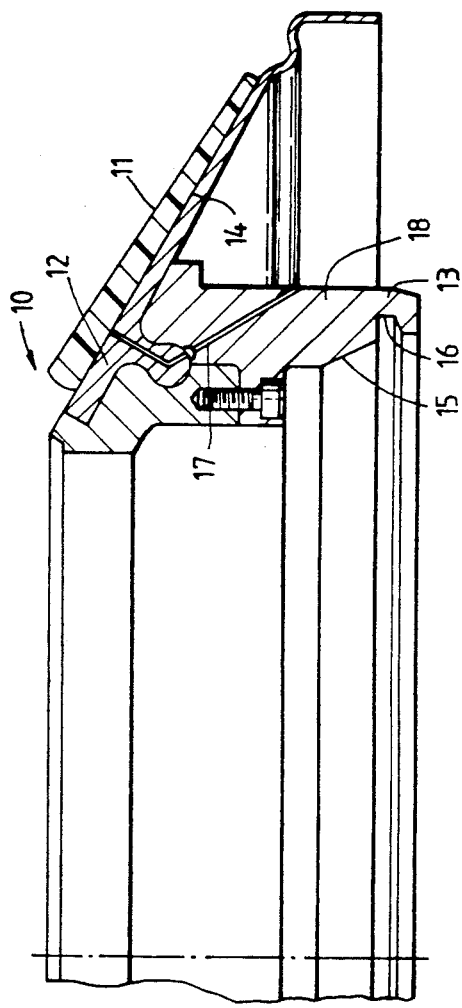
FIG. 1 is a cross-section through a mandrel forming a part of the apparatus of the present invention.

Now with reference to FIG. 1 of the accompanying drawings, an annular component for a tire, preferably an uncured sidewall 11 for a radial carcass pneumatic tire, is produced on a mandrel 10 at one station and is then transferred in situ on the madrel 10 to another station as a component in substantially its finished shape. The mandrel comprises an annular support 12, made preferably from a polyurethane elastomer, which is mounted on a rigid coaxial transferable carrier 13. The flexible support 12 in its relaxed configuration has a frustoconical outer surface 14 on which the sidewall 11, also in frustoconical form, is laid.

It will be seen that the radially inner surface of the carrier 13 has a conical seat 15 thereon and an annular latching groove 16 whose functions are associated with the mounting of the carrier to an apparatus for the forming of the sidewall 11 and also for the subsequent assembly of the sidewall to a tire at a second apparatus. There is also at least one air passage 17 extending through the flexible support 12 from the conical surface 14 to the radially outer cylindrical surface 18 of the carrier. This passageway may be untilised for the application of vacuum to hold the sidewall component in place, or for the application of air to separate the sidewall component from the polyurethane support 12. The flexible support 12 is utilised in a later process which does not form part of the present invention, for the transfer of the sidewall 11 to a tororoidal tire carcass.

Figure 2:
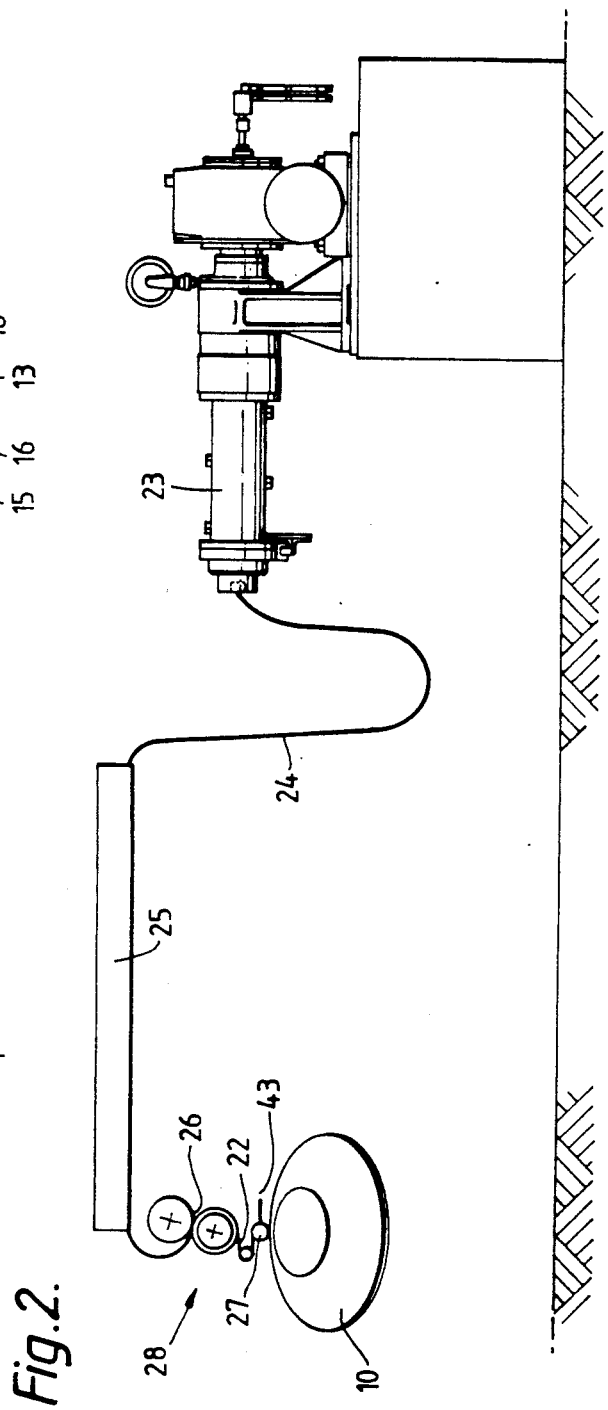
FIG. 2 is a schematic drawing illustrating a method of manufacture of a tire component according to this invention.

Now with reference to FIG. 2, the uncured sidewall 11 is formed onto the mandrel 10 by spirally winding a strip 22 of uncured elastomeric material onto the frustoconical surface 14 of the mandrel.

The elastomeric sidewall material is processed by an extruder 23 and the extrudate 24 is fed to a conveyor 25 via a loop so as to even out variations in speed between the convey take-off and the extruder out put. The extrudate while still warm is fed to a pair of calender rolls 26 which form part of a laying head 28 of the type described in U.S. Pat. No. 4,871,409 issued Oct. 3, 1989. The calendered strip 22 is then fed around an application roller 27, also on the head 28, to lay the strip onto the mandrel.

The mandrel 10 and the laying head 28 are moved relative to each other, preferably by rotation of the mandrel 10 about its axis while moving the laying head 28 radially of the mandrel to form then an uncured sidewall comprising a plurality of turns of strip on the mandrel in substantially its finished form.

The rotational speed of the mandrel is variable to compensate for the changing circumference of the mandrel surface as the strip is wound radially inwardly or outwardly so as to maintain a constant surface speed at the point of application of the strip to the mandrel.

Figure 3:
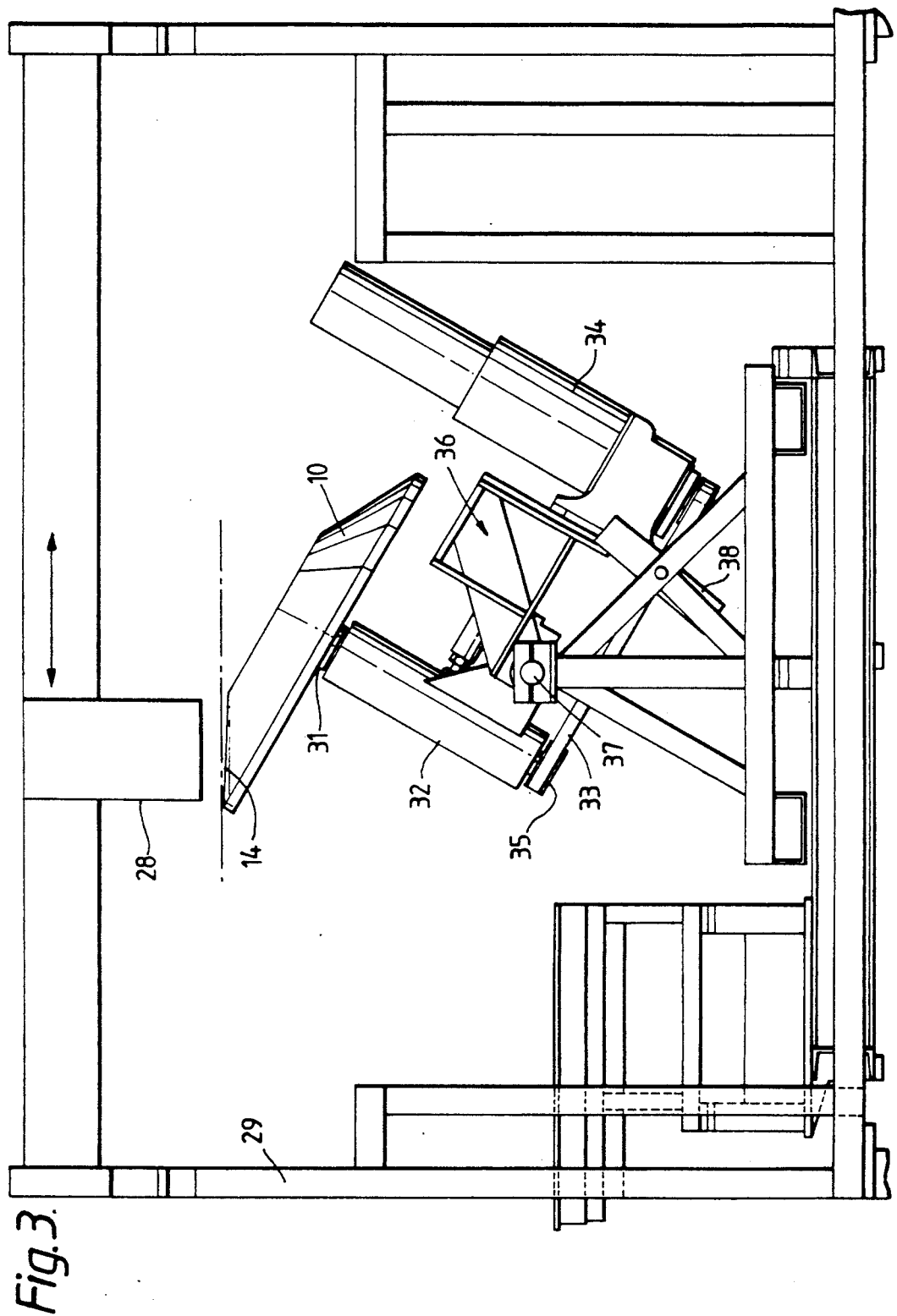
FIG. 3 is an elevation of an apparatus according to this invention showing the mandrel in-situ.
Figure 4:
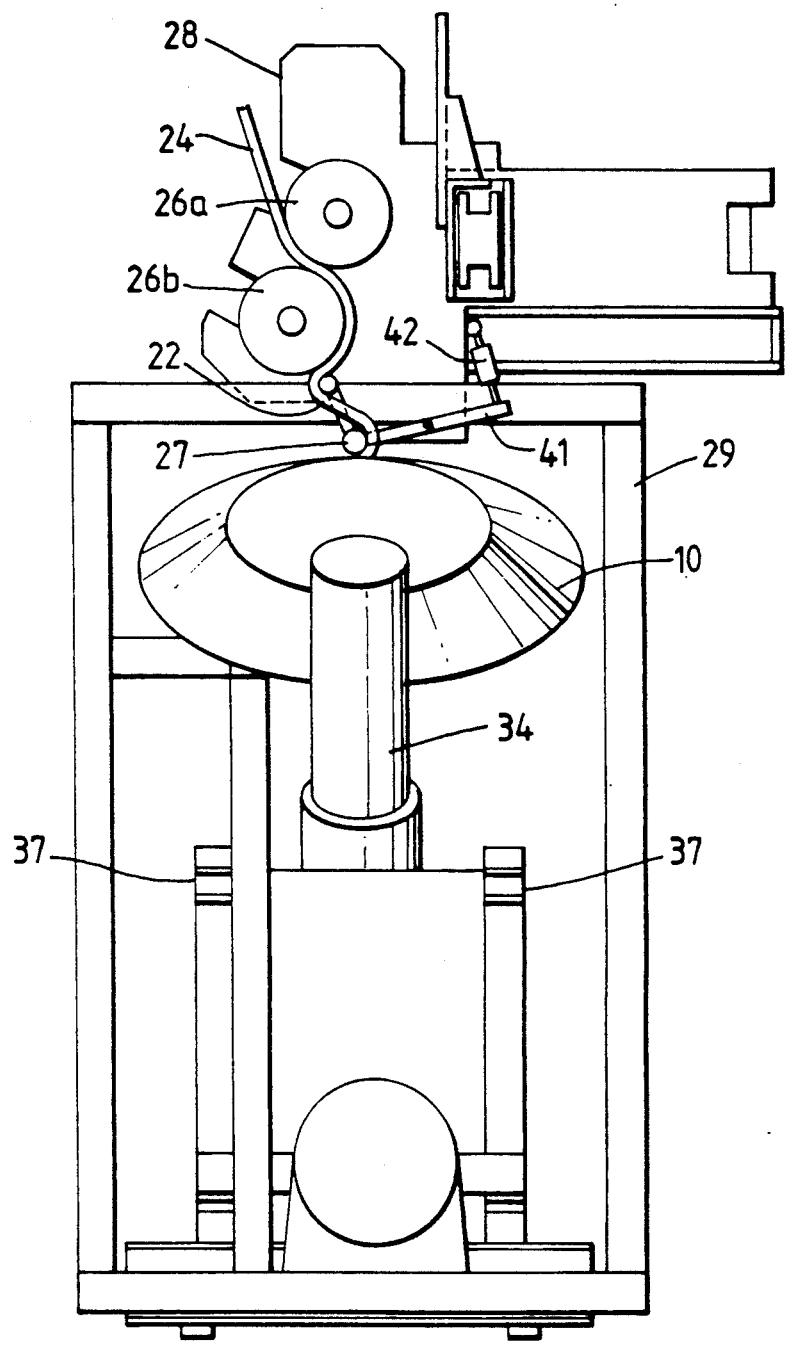
FIG. 4 is an elevation of the apparatus of FIG. 3 showing the calender in-situ.

With reference to FIG. 3 and FIG. 4 the extrudate strip 24 is passed between the rollers 26a and 26b of the laying head 28 which is mounted on a main frame 29 of the apparatus. The laying head is mounted on the frame 29 by means of struts (not shown) on which the head is moveable so that its position can be altered as is desired to lay the calendered strip across the frustoconical surface 14 of the mandrel 10. The laying head may be moved by screw threaded struts and the movement of the head is co-ordinated with the speed of the calender and the rotation of the mandrel so as to spirally wind an annular sidewall component 11 onto the surface of the mandrel, either in abutment or overlap as desired. The relationship between the mandrel rotation and the traversing speed of the laying head is also variable so that a desired amount of overlap between subsequent turns of the extrudate can be achieved. This enables a range of different profiles (cross sectional) to be made.

The mandrel 10 is mounted on a turning head 31 for rotation about its axis. The turning head 31 is located at the upper end of a cylindrical body 32 and is caused to rotate therein by a drive belt or chain 33 connected between a pulley 35, on a shaft connected with the head 31 and located at the lower end of the body 32, and a motor 34, preferably an electrical motor. The motor, 34, cylindrical body 32, and mandrel 10 are all mounted on a sub-frame 36 which in turn is mounted by pivots 37 to the main frame 29 so that the angle of orientation of the cylindrical body 32 and hence the mandrel can be altered relative to the frame 29 by operation of an actuator 38.

As illustrated in FIGS. 3 and 4 the mandrel 10 is oriented in the desired position for receiving the calendered strip 22, and is orientated with its axis at an angle to the vertical so that its frustoconical outer surface 14 is substantially horizontal at the point of application of the strip 22 to the mandrel. The calendered strip is fed onto the mandrel via an application roller 27 which may exert a light application load (500 gms) onto the strip as it is fed onto the surface of the mandrel.

The application roller 27 is mounted on an arm 41 pivoted to the laying head 28 which is moveable by an actuator 42 to lift the roller 27 off the mandrel or exert the application load.

The laying head 28 will move radially across the mandrel surface 14 as the strip is laid and on completion of the component the strip is cut by a cutter 43 (see FIG. 2) which is mounted on the arm 41.

After completion of the forming of the sidewall 11, the mandrel 10 is reorientated so that its axis is vertical and the mandrel is removed from the turning head 31 with the component in situ.

The mandrel and component are then taken to another machine station for assembly to a toroided tire carcass. This latter operation is described in applicant's copending application Ser. No. 07/339,183 filed on the same day as the present application, now U.S. Pat. No. 5,108,527.

We claim:

1. A mandrel for the manufacture of an annular uncured elastomeric component for a tire, said mandrel comprising a flexible support which is deformable in use,
    said flexible support having a generally radially outwardly facing frustoconical annular outer surface for receiving a strip of unvulcanized elastomeric material for forming an annular tire component thereon,
    said flexible support also having a generally radially inwardly facing frustoconical inner surface,
    said flexible support being mounted upon a rigid carrier positioned radially inwardly of the inner surface of said flexible support, said rigid carrier having an outer surface complementary to the inner surface of said flexible support,
    the carrier having attachment means for mounting on a turning head for rotation of said mandrel as a strip of uncured elastomeric material is laid onto the outer surface of said flexible support.

2. Apparatus as claimed in claim 1 wherein the rigid carrier supports only the radially inner portion of the flexible support and the radially outer portion is displaceable relative to the carrier.

3. Apparatus as claimed in claim 2 wherein the flexible support is made from a polyurethane material.

4. A mandrel as claimed in claim 1, including air passageways extending through the flexible support and the rigid carrier for the application of vacuum to hold a component in place on the support, or air in order to remove the component from the support.

5. Apparatus for the manufacture of an annular uncured elastomeric component for a tire and which comprises:
    a means for producing unvulcanized elastomeric strip,
    an apparatus frame,
    a turning head mounted on the frame,
    drive means for rotating the turning head relative to the strip producing means,
    and, a mandrel detachably mounted on the turning head to receive the elastomeric strip, said mandrel comprising an annular flexible support having a frustoconical outer receiving surface thereon to receive said strip of unvulcanized elastomeric material, and an inner surface; a rigid carrier having an outer surface complementary thereto on which the inner surface of the flexible support is mounted, the carrier having attachment means for mounting the carrier on said turning head for rotation of the mandrel as said strip is laid onto said frustoconical receiving surface to form said component.

6. Apparatus according to claim 5 and wherein the strip producing means is an extruder for forming an extrudate strip of unvulcanized elastomeric material and the apparatus further comprises a laying head which includes a calender means which receives the extrudate strip and produces an accurately dimensioned strip for laying onto the mandrel surface.

7. Apparatus as claimed in claim 5 wherein the turning head is pivotally mounted on the frame so that the orientation of the axis of rotation of the mandrel can be varied as desired.

8. Apparatus as claimed in claim 7, wherein the mandrel is mounted on the turning head so that its frustoconical surface is held substantially horizontal at the point of application of the strip to the mandrel.

9. Apparatus as claimed in claim 5 including further a body in which the turning head rotates, and a sub frame pivoted to the apparatus frame and on which said body is mounted, so that orientation of the axis of rotation of the mandrel is effected by movement of the sub-frame relative to the apparatus frame, such that said axis of rotation is substantially vertical for mounting and dismounting of the mandrel onto the turning head, and is inclined at an angle to the vertical so that the frustoconical surface is substantially horizontal for receiving the strip.

10. Apparatus as claimed in claim 7, wherein a laying head is mounted on said apparatus frame and is moveable radially of the mandrel to spirally wind the strip onto the mandrel to produce a component from a plurality of turns of the strip.

11. Apparatus as claimed in claim 10 wherein the drive means is a variable speed drive means so as to allow the surface speed of the mandrel at the point of application of the extrudate strip to be kept substantially constant to compensate for the changing radius of application of the strip onto the receiving surface.

* * * * *